United States Patent [19]

Maniar et al.

[11] Patent Number: 5,525,191

[45] Date of Patent: Jun. 11, 1996

[54] PROCESS FOR POLISHING A SEMICONDUCTOR SUBSTRATE

[75] Inventors: Papu D. Maniar; Chris C. Yu, both of Austin, Tex.

[73] Assignee: Motorola, Inc., Schaumburg, Ill.

[21] Appl. No.: 280,233

[22] Filed: Jul. 25, 1994

[51] Int. Cl.$^6$ ................................................ H01L 21/306
[52] U.S. Cl. ................................. 156/636.1; 156/645.1; 437/228
[58] Field of Search ............................... 156/636, 645; 432/228; 51/308, 309

[56] References Cited

U.S. PATENT DOCUMENTS

| | | | |
|---|---|---|---|
| 4,420,531 | 12/1983 | Tokuda | 428/329 |
| 4,944,836 | 7/1990 | Beyer et al. | 156/645 |
| 5,084,071 | 1/1992 | Nenadic et al. | 51/309 |
| 5,166,093 | 11/1992 | Grief | 437/173 |
| 5,209,816 | 5/1993 | Yu et al. | 156/636 |
| 5,225,034 | 7/1993 | Yu et al. | 156/636 |
| 5,226,930 | 7/1993 | Sasaki | 51/308 |
| 5,228,886 | 7/1993 | Zipperian | 51/293 |
| 5,278,092 | 1/1994 | Sato | 437/90 |
| 5,312,512 | 5/1994 | Allman et al. | 156/636 |
| 5,328,553 | 7/1994 | Poon | 156/636 |
| 5,391,258 | 2/1995 | Brancaleoni et al. | 156/636 |

OTHER PUBLICATIONS

"CRC Handbook of Chemistry and Physics", R. Weast, Ed., 1975, pp. F–22 and F–78.
Henry, et al.; "Inorganic Polymerization In Aqueous Solutions;" Chemical Processing of Advanced Materials; pp. 223–237 (1992).
Matijevic; "Preparation and Properties of Uniform Size Colloids;" Chem. Mater., vol. 5, No. 4, pp. 412–426 (1993).
Cook; "Chemical Processes In Glass Polishing;" Journ. of Non–Crystalline Solids 120; pp. 152–171 (1990).

Primary Examiner—George Fourson
Assistant Examiner—Thomas G. Bilodeau
Attorney, Agent, or Firm—George R. Meyer

[57] ABSTRACT

The selection of pH, the polishing slurry, and types of polishing particles within a polishing slurry are chosen, so that polishing product is capable of coating onto the polishing particles. More specifically, the pH of the polishing slurry is selected to be between the iso-electric points of the polishing product and the particles within the polishing slurry. More than one type of material may be used within a polishing slurry. Particles of one material may do most of the polishing, while the particles of the other material become coated with polishing product and aid in transporting it away from the substrate.

13 Claims, 2 Drawing Sheets

PROCESS FOR POLISHING A SEMICONDUCTOR SUBSTRATE

RELATED APPLICATION

This is related to U.S. patent application Ser. No. 08/280,232, filed Jun. 25, 1994, and is assigned to the current assignee hereof.

FIELD OF THE INVENTION

The present invention relates to semiconductor devices, and in particular, to polishing semiconductor substrates.

BACKGROUND OF THE INVENTION

The technology related to polishing semiconductor substrates has existed for many years. One problem associated with polishing is clogging of polishing pad pores by polishing particles and polishing products. Typically, a layer is polished with a slurry usually having polishing particles made of one material. For example, the polishing slurry typically includes alumina particles, silica particles, or the like, but does not include a combination of alumina and silica particles, etc.

SUMMARY OF THE INVENTION

The present invention includes a process for polishing a semiconductor substrate or an insulating layer over the substrate. The substrate or layer is polished with a slurry including particles that include a material having a first iso-electric point. The step of polishing forms a polishing product having a second iso-electric point that is different from the first iso-electric point. The slurry has a pH that is between the first and second iso-electric points.

The present invention also includes a process for polishing a layer over a semiconductor substrate comprising the steps of forming the layer over the substrate and polishing the layer with a slurry including a first particle and a second particle. The first particle has a first material, and the second particle has a second material that is different from the first material.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawing, in which like references indicate similar elements, and in which.

DETAILED DESCRIPTION OF EMBODIMENTS

The selection of pH and particles within a polishing slurry are chosen, so that polishing product is capable of coating onto the particles and being subsequently transported away from a polishing pad. More specifically, the pH of the polishing slurry is selected to be between the iso-electric points of the polishing product and the particles within the polishing slurry. More than one type of material may be used within a polishing slurry. The present invention is better understood with the embodiments that are described below.

Iso-Electric Point

Many types of materials in an aqueous solution have an iso-electric point, which is a point at which the material within the aqueous solution will neither move toward an anode or a cathode. In general, the iso-electric point is expressed as a pH. By adjusting the pH of the aqueous solution, the material will not drift toward either the anode or cathode. For example, if silicon dioxide particles are within an aqueous solution at a pH of about 2.2, the silicon dioxide particles will not travel toward the anode or cathode. Other materials have similar properties. For ceria ($CeO_2$), the iso-electric point is about 6.8; for cerium trioxide ($Ce_2O_3$), the iso-electric point is about 9.6; for alumina ($Al_2O_3$), the iso-electric point is about 9; for magnesium oxide (MgO), the iso-electric point is about 12.4; for titanium dioxide ($TiO_2$), the iso-electric point is about 6.2; and for zirconium dioxide ($ZrO_2$), the iso-electric point is also about 6.2. Particles of any of these types of materials may be used as abrasives in chemical-mechanical polishing. Nitrides, including silicon nitride ($Si_3N_4$), aluminum nitride (AlN), titanium nitride (TiN), or the like may also be used. Therefore, it can be seen that various materials that may be used in polishing slurries may have different iso-electric points.

Embodiments of the present invention use particles within a polishing slurry to help attract polishing products and aid removing the polishing products from the substrate and polishing pad and reduce the chances of clogging pores of a polishing pad. More specifically, the selection of the pH of the polishing slurry is adjusted such that it has a pH between the iso-electric points of the polishing product and the particles within the polishing slurry.

Figure 1:
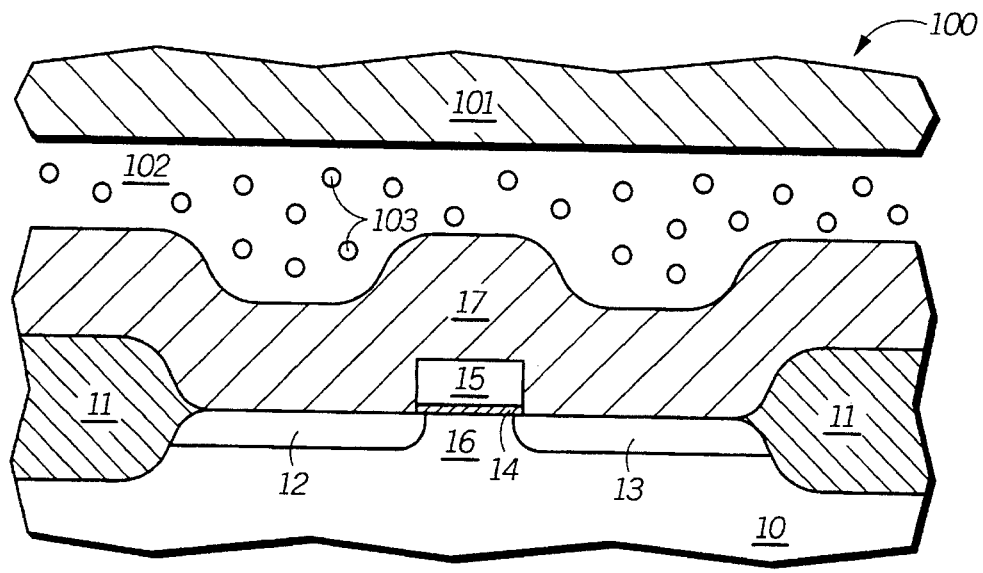
FIG. 1 includes a cross-sectional view of a portion of a semiconductor substrate having an insulating layer at the beginning of a polishing step in accordance with an embodiment of the present invention.

FIG. 1 includes an illustration of a cross-sectional view of a portion of a semiconductor substrate 10. Field isolation regions 11, source region 12, and drain region 13 are formed from part of the substrate 10. A gate dielectric layer 14 and a gate electrode 15 overlie the substrate 10 and portions of the source and drain regions 12 and 13. A channel region 16 is that portion of the substrate 10 lying between source and drain regions 12 and 13 and underlying the gate dielectric layer 14. An insulating layer 17 overlies the field isolation regions 11, source and drain regions 12 and 13, and the gate electrode 15. The insulating layer 17 may include an oxide, such as borophosphosilicate glass (BPSG), phosphosilicate glass (PSG), undoped oxide, and the like. Note that insulating layer 17 has a topography that generally matches the topography of the underlying layers. The insulating layer 17 is to be polished, so that its exposed surface is flat.

The substrate 10 is placed in a chemical-mechanical polisher 100 that has a polishing pad 101. At the beginning of polishing, a polishing slurry 102 including polishing particles 103 is located between the insulating layer 17 and the polishing pad 101. Although particles 102 are illustrated as being spherical, particles 103 may have virtually any shape including polygons. The slurry 102 has a pH between the iso-electric point of the insulating layer 17 and the particles 103. In this specific example, the polishing product includes the insulating layer 17 that includes silicon dioxide, which has an iso-electric point of about 2.2. The particles within the polishing slurry include magnesium oxide which has an iso-electric point of about 12.4. The slurry has a pH of about 9.5–10.0, which is between the iso-electric point of the silicon dioxide and magnesium oxide. Caustic chemicals, such as potassium hydroxide, ammonium hydroxide, and the like, may be used to increase the pH if the polishing slurry pH is not high enough.

Figure 2:
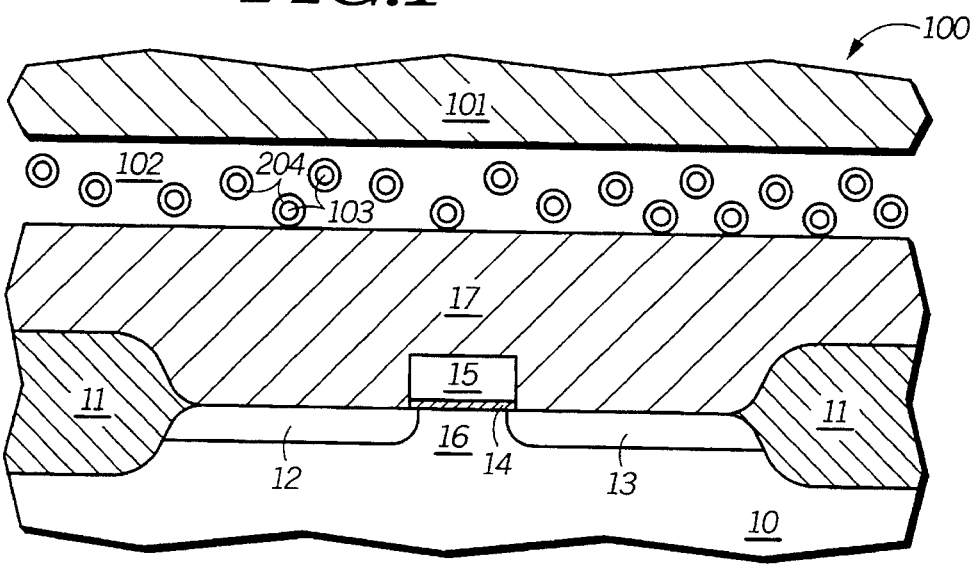
FIG. 2 includes a cross-sectional view of the substrate of FIG. 1 near the end of polishing the insulating layer in accordance with an embodiment of the present invention.

The insulating layer 17 is polished to give a planar surface as shown in FIG. 2. During the polishing process, the polishing product 204 is coated around the slurry particles 103 within the polishing slurry 102. The polishing product 204 includes silicon dioxide from insulating layer 17. The polishing product is removed by the particles 103 as they flow away from the substrate 10.

In alternate embodiments, the particles used for the polishing slurry could have included ceria, alumina, zirconium dioxide, or the like. With magnesium oxide as described above, the slurry pH is below 12.4. For ceria, the slurry pH is below 6.8; for alumina, the slurry pH is below 9, and for zirconium dioxide, the slurry pH is below 6.2. The pH of the slurry may be adjusted by changing or adding potassium hydroxide or ammonium hydroxide to the slurry or adding acids, such as nitric acid, hydrochloric acid, and the like. It is possible that other basic solutions could be used and in general a nonmetallic ion basic solution should be used. Of the materials recited above, magnesium oxide or alumina particles should be used because the stronger attraction between the oxide polishing product and polishing particle surface. Such a stronger attraction should reduce or eliminate clogging of the polishing pad pores because the polishing product is more likely to be attracted to the polishing particle surface. This discussion is not meant to limit the invention, but to present some options that are available.

The principle of this invention may also be extended to polishing a semiconductor layer or a semiconductor substrate itself. During the formation of well regions, the topography of the substrate may not remain planar. For example, a well oxide may be grow over portions of a substrate where a well region is not to be formed. The oxidation for the well region is typically performed with an oxidation resistant mask including silicon nitride or the like over the well region. The oxidation resistant mask is then removed leaving the well oxide as an implanting mask. An implanting step is performed to dope the substrate with a dopant and, a thermal cycle activates and drive the dopant to form the well region. The well region may be a p-well or an n-well.

Figure 3:
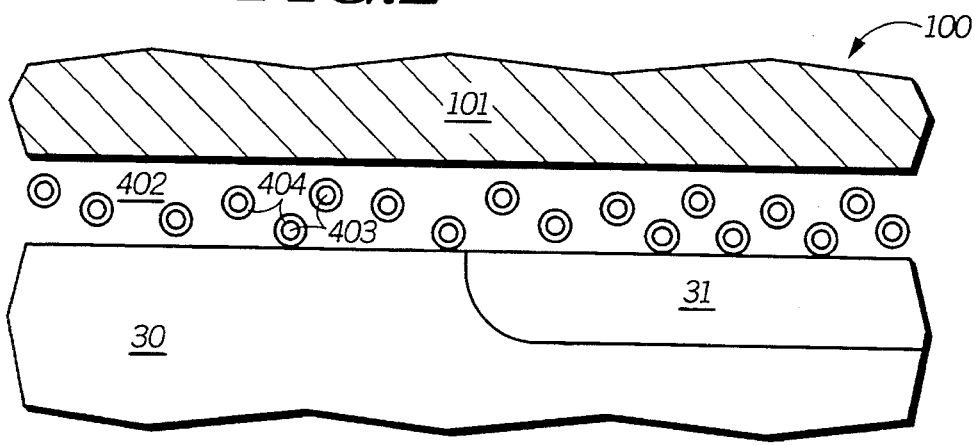
FIG. 3 includes a cross-sectional view of a portion of a semiconductor substrate after polishing the substrate in accordance with an embodiment of the present invention.

After formation of the well region, the substrate typically has an elevation difference between the substrate and the well region formed within the substrate. The step height difference may be in a range of 1000–3000 angstroms high. In some processes, such a step height difference may be undesired. To obtain a flat substrate, the substrate is polished to remove any portions of the substrate or well region that are higher than the other regions. The polishing of the substrate and well region is similar to the previous embodiment in that the polishing product includes oxidized silicon, the particles may include alumina, magnesium oxide, or the like, and the slurry pH is in a range of 9–11. Referring to FIG. 3, a substrate 30 includes a well region 31 near the end of the polishing step. A polishing slurry 402 includes particles 403. During the polishing of the substrate and well regions 30 and 31, polishing product 404 is coated around the particles 403. Once again, the pH of the polishing slurry 402 lies between the iso-electric points of the particles 403 and the polishing product 404. The polishing slurry has a pH in a range of 9–11, and more specifically, may be 10. Other examples of the semiconductor substrate include germanium, silicon carbide, or the like.

Multi-Particle Polishing Slurry

In another embodiment more than one type of polishing particle may be included within the polishing slurry. A substrate includes a non-planer surface and may include a semiconductor material or an insulating layer including silicon dioxide or the like. A polishing slurry is selected such that it includes a smaller set of particles and a larger set of particles. The smaller particles are softer (less hard) than the larger particles. Therefore, the harder particles actually remove more the substrate during polishing compared to softer particles. The polishing product is coated around the smaller particles to aid the polishing product removal. The pH of the polishing slurry is between the iso-electric point of the polishing product and the smaller particles. This embodiment is better understood with a specific example that is described below.

Figure 4:
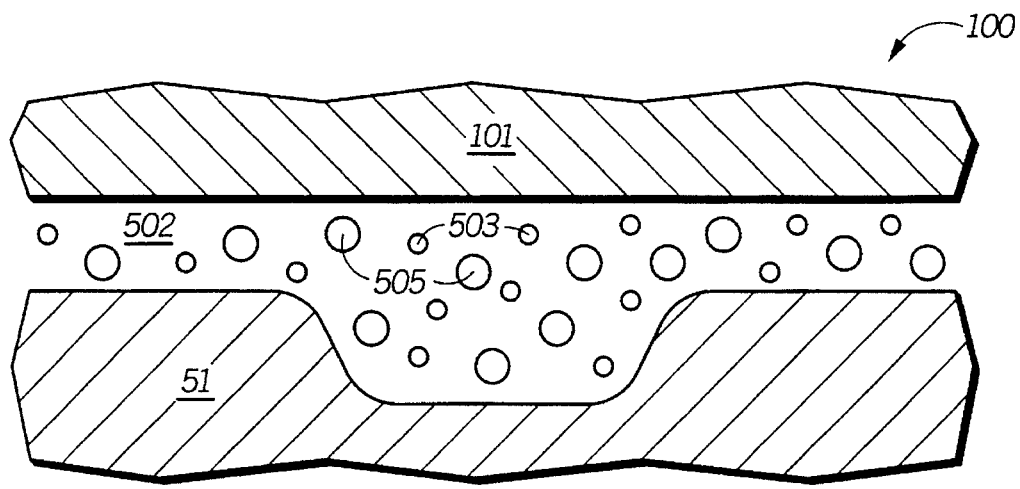
FIG. 4 includes a cross-sectional view of a portion of a semiconductor substrate having an insulating layer at the beginning of a polishing step using a multi-particle slurry in accordance with another embodiment of the present invention.

Referring to FIG. 4, a substrate 51 is a combination of a semiconductor material (not shown) and an insulating layer that includes an oxide, has a non-planer surface, and overlies the semiconductor material. A polishing slurry 502 has magnesium oxide particles 503 and silica particles 505. The width of the magnesium oxide particles 503 are narrower than the width of the silica particles 505. Also, the magnesium oxide particles 503 are softer (less hard) than the silica particles 505. With this selection of polishing particles, most of the polishing (abrading) occurs with the silica particles 505 and lessens the chances of plating magnesium oxide from the magnesium oxide particles 503. The polishing product includes oxide. The pH of the polishing slurry is between 2.2 (iso-electric point of oxide) and 12.4 (iso-electric point of magnesium oxide). Because oxide polishes at a higher rate in a basic solution, the pH of the polishing slurry 502 is typically in a range of 9–10.

Figure 5:
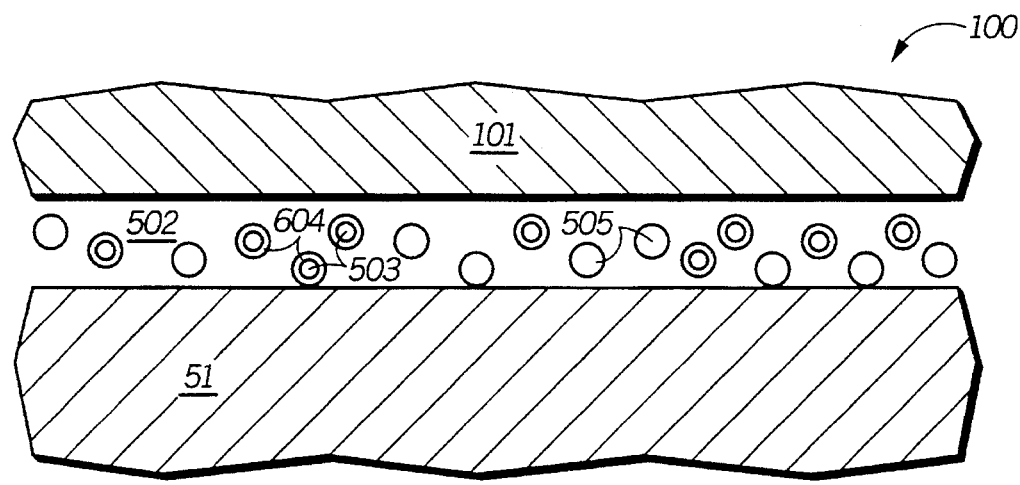
FIG. 5 includes a cross-sectional view of the substrate of FIG. 4 near the end of polishing the insulating layer in accordance with an embodiment of the present invention.

The substrate 51 is polished to achieve a planar surface as shown in FIG. 5. In this embodiment, most of the removal of the substrate 51 occurs with the silica particles 505 to form a polishing product 604 that includes oxide, due to the greater hardness of silica. On the other hand, magnesium oxide has a significantly higher iso-electric point compared to the oxide polishing product. The polishing product 604 coats onto the magnesium oxide particles 503 but does not coat onto silica particles 505. The reason for such coating not occurring with particles 505 is that it has an iso-electric point that is substantially the same as the polishing product 604. The benefits of this embodiment are explained below.

Benefits

The present invention includes many benefits. The embodiments allow a polishing product to coat onto a particle within the polishing slurry. Transport of the polishing product away from the substrate may be easier and may not have to travel through the polishing pad pores. This reduces the likelihood that the pores within the polishing pad will become clogged. With the present invention, a user only needs to know the iso-electric point of the polishing product that will be generated and the iso-electric point of the particles within the polishing slurry. After these are known, the pH may be adjusted such that it is between the iso-electric points of the particles and polishing product. The particles and pH of the polishing slurry may be adjusted to give good polishing rates. For example, silicon dioxide polishes at a higher rate in basic solutions. Therefore, particles having a material with a high iso-electric point are desired for polishing silicon dioxide.

Another benefit of the present invention is that a plurality of different materials for the particles may be used. More specifically, a softer and harder particle may be used at the same time, where the harder particle does more polishing than the softer particles. In this manner, a polishing step may be specifically tailored to take into account individual characteristics of a film. Referring to a previously described embodiment, oxide is polished with a polishing slurry 502 that includes smaller and softer magnesium oxide particles 503 and larger and harder silica particles 505. Alumina particles may have been used, but may be avoided to reduce the likelihood of causing scratches. If two sizes of only magnesium oxide particles 503 were used in the polishing slurry 505, magnesium oxide may plate onto the substrate 51 if the substrate holder pressures is too high. Low substrate holder pressures typically have a lower polishing rate. If two sizes of only silica particles 505 were used, the polishing product 604 would probably not coat onto the silica particles 505 because the silica particles 505 and polishing product 604 have about the same iso-electric point, and as a result, the polishing product would tend to coat onto the polishing pad thereby increasing the chances that the polishing pad pores become clogged. This embodiment allows larger and harder particles to polish without being coated, while smaller and softer particles become coated with the polishing product and aid in transporting polishing product to reduce the likelihood of clogging pores within the polishing pad. Selection of particles for the polishing slurry may be done to independently increase both the polishing rate and chances of coating polishing product onto particles. Because a number of different materials for the particles are available, the present invention is quite flexible for polishing nearly any type of material.

Still another benefit of the present invention is that the polishing parameters (platen rotational velocity, substrate holder pressure, etc.) may require little, if any, changing. Adaptation into existing polishing processes may be relatively easy. Therefore, development of completely new polishing processes should be unnecessary.

In the foregoing specification, the invention has been described with reference to specific embodiments thereof. However, it will be evident that various modifications and changes can be made thereto without departing from the broader spirit or scope of the invention as set forth in the appended claims. Accordingly, the specification and drawings are to be regarded in an illustrative rather than a restrictive sense.

What is claimed is:

1. A process for polishing a layer over a semiconductor substrate comprising the steps of:

forming the layer over the substrate; and polishing the layer with a slurry including first particles and second particles, wherein:

the first particles include magnesium oxide;

the second particles are selected from a group consisting of silica, alumina, cerium dioxide, cerium trioxide, and zirconium dioxide;

each of the first particles is smaller than each of the second particles; and the step of polishing forms a polishing product that includes silicon dioxide.

2. The process of claim 1, wherein each of the first particles are softer than the second particles.

3. The process of claim 1, wherein the slurry has a pH higher than 2.2 and lower than 12.4.

4. A process for polishing a semiconductor substrate comprising the steps of:

placing the substrate into a polisher; and polishing the substrate with a slurry including first particles and second particles, wherein:

the substrate includes a semiconductor material;

the polishing step has a beginning, and at the beginning, the semiconductor material contacts the slurry;

the first particles include a material having a first iso-electric point;

the second particles include a material having a second iso-electric point that is different from the first iso-electric point;

each of the first particles is smaller than each of the second particles;

the step of polishing forms a polishing product having a third iso-electric point that is different from the first iso-electric point;

the slurry has a pH that is between the first and third iso-electric points; and the first iso-electric point is higher than the second iso-electric point, the third iso-electric point, and the pH of the slurry.

5. The process of claim 4, wherein the semiconductor material is selected from a group consisting of silicon and germanium.

6. The process of claim 4, wherein:

the second particles include a material selected from a group consisting of magnesium oxide, cerium trioxide, and zirconium monoxide;

the polishing product includes silicon dioxide; and the slurry has a pH higher than 2.2 and no higher than 10.0.

7. A process for polishing a layer over a semiconductor substrate comprising the steps of:

forming the layer over the substrate; and polishing the layer with a slurry including first particles and second particles, wherein:

the first particles includes a first material;

the second particles include a nitride; and each of the first particles is smaller and softer than each of the second particles.

8. The process of claim 7, wherein:

the first particles include magnesium oxide; and the step of polishing forms a polishing product that includes silicon dioxide.

9. The process of claim 8, wherein the slurry has a pH higher than 2.2 and lower than 12.4.

10. A process for polishing a layer over a semiconductor substrate comprising the steps of:

forming the layer over the substrate; and polishing the layer with a slurry including first particles and second particles wherein:

the first particles include magnesium oxide and has an iso-electric point;

the second particles include silica and has an iso-electric point;

each of the first particles is smaller and softer than each of the second particles;

the step of polishing forms a polishing product that includes silicon dioxide and has an iso-electric point that is different from the iso-electric point of the magnesium oxide;

the iso-electric point of the silica is a same as the iso-electric point of the polishing product; and the slurry has a pH that is between the iso-electric points of the magnesium oxide and the polishing product.

11. The process of claim 10, wherein the slurry has a pH higher than 2.2 and lower than 12.4.

12. The process of claim 1, wherein the step of polishing forms a polishing product, and wherein first particles have an iso-electric point higher than an iso-electric point of the second particles, an iso-electric point of the polishing product, and a pH of the slurry.

13. The process of claim 4, wherein each of the first particles is softer than the second particles.

* * * * *